United States Patent [19]
Hoogerwerf et al.

[11] Patent Number: 5,956,635
[45] Date of Patent: Sep. 21, 1999

[54] DETECTION AND PREVENTION OF CHANNEL GRABBING IN A WIRELESS COMMUNICATIONS SYSTEM

[75] Inventors: David N. Hoogerwerf, Everett; David M. Stanhope, Tacoma, both of Wash.; Randy McKernan, Graton, Calif.

[73] Assignee: Cellular Technical Services Company, Inc., Seattle, Wash.

[21] Appl. No.: 08/680,930

[22] Filed: Jul. 16, 1996

[51] Int. Cl.[6] .................................................. H04B 7/24
[52] U.S. Cl. ........................ 455/411; 455/414; 455/67.1
[58] Field of Search .................... 455/410, 411, 455/67.1, 414, 416, 507, 515, 524, 67.6

[56] References Cited

U.S. PATENT DOCUMENTS

| | | | |
|---|---|---|---|
| 4,800,387 | 1/1989 | Joy | 342/165 |
| 4,843,562 | 6/1989 | Kenyon et al. | 364/487 |
| 4,955,049 | 9/1990 | Ghisler . | |
| 5,005,210 | 4/1991 | Ferrell | 455/115 |
| 5,091,942 | 2/1992 | Dent | 380/46 |
| 5,222,140 | 6/1993 | Beller et al. | 380/30 |
| 5,237,612 | 8/1993 | Raith | 380/23 |
| 5,239,294 | 8/1993 | Flanders et al. | 340/825.34 |
| 5,241,598 | 8/1993 | Raith | 380/21 |
| 5,282,250 | 1/1994 | Dent et al. | 380/23 |
| 5,299,263 | 3/1994 | Beller et al. | 380/30 |
| 5,303,285 | 4/1994 | Kerihuel et al. . | |
| 5,309,501 | 5/1994 | Kozik et al. . | |
| 5,315,636 | 5/1994 | Patel . | |
| 5,319,699 | 6/1994 | Kerihuel et al. . | |
| 5,329,591 | 7/1994 | Magrill | 380/25 |
| 5,335,265 | 8/1994 | Cooper et al. . | |
| 5,335,278 | 8/1994 | Matchett et al. | 380/23 |
| 5,345,595 | 9/1994 | Johnson et al. . | |
| 5,375,244 | 12/1994 | McNair | 395/725 |
| 5,390,245 | 2/1995 | Dent et al. | 380/23 |
| 5,392,355 | 2/1995 | Khurana et al. | 455/411 |
| 5,392,356 | 2/1995 | Konno et al. | 380/23 |

(List continued on next page.)

FOREIGN PATENT DOCUMENTS 0 629 093 A1   12/1994   European Pat. Off. ......... H04Q 7/04

OTHER PUBLICATIONS

U.S. application No. 08/670,512, David N. Hoogerwerf et al., filed Jun. 27, 1996.
U.S. application No. 06/670,489, David N. Hoogerwerf et al., filed Jun. 27, 1996.

*Primary Examiner*—Reinhard J. Eisenzopf
*Assistant Examiner*—Lester G. Kincaid
*Attorney, Agent, or Firm*—Seed and Berry LLP

[57] ABSTRACT

A method and system for detecting a voice channel grab by a pirate in a cellular telephone network. Initially, RF signals transmitted to and from an authorized cellular telephone over the control and voice channels are monitored to track call processing activities and obtain various data that are used to detect potential voice channel grabbing attempts. The data may include such things as RSSI, change power output messages and responses, and hook-flash signal. From the data, the system looks for two events. A first event is an unexpected change or an absence of an expected change in the voice channel RF signal indicating that the pirate may be transmitting on the voice channel. The first event may be any one or more of the following: (1) a sudden upward shift in the voice channel RSSI; (2) an unexpected phase shift of either the RF signal or the SAT signal contained in the RF signal; and (3) an absence of an expected shift in the RSSI that corresponds to the change power level message from the network. The second event is receipt of a message indicative of a request to establish a new telephone connection such as a hook-flash message initiating a call conference. When the unexpected change in the RF signal and the message indicative of the request to establish the new telephone connection are detected, the system determines that the voice channel assigned to the authorized cellular telephone has been grabbed by the pirate. When the system determines that the channel grab has occurred, it prevents the pirate from establishing the new telephone connection by preventing receipt of dialed digits or terminating the connection on the voice channel.

43 Claims, 6 Drawing Sheets

U.S. PATENT DOCUMENTS

| | | | |
|---|---|---|---|
| 5,420,908 | 5/1995 | Hodges et al. . | |
| 5,420,910 | 5/1995 | Rudokas et al. | 455/410 |
| 5,448,760 | 9/1995 | Frederick | 455/410 |
| 5,455,863 | 10/1995 | Brown et al. | 380/23 |
| 5,465,387 | 11/1995 | Mukherjee | 455/411 |
| 5,467,382 | 11/1995 | Schorman . | |
| 5,488,649 | 1/1996 | Schellinger . | |
| 5,509,075 | 4/1996 | Grube et al. | 380/23 |
| 5,517,554 | 5/1996 | Mitchell et al. . | |
| 5,517,555 | 5/1996 | Amadon et al. . | |
| 5,517,568 | 5/1996 | Grube et al. | 380/23 |
| 5,535,431 | 7/1996 | Grube et al. . | |
| 5,537,474 | 7/1996 | Brown et al. | 380/23 |
| 5,541,977 | 7/1996 | Hodges et al. . | |
| 5,548,636 | 8/1996 | Bannister et al. | 379/201 |
| 5,551,073 | 8/1996 | Sammarco . | |
| 5,555,192 | 9/1996 | Grube et al. | 364/514 R |
| 5,555,551 | 9/1996 | Rudokas et al. . | |
| 5,557,654 | 9/1996 | Mäenpää . | |
| 5,615,408 | 3/1997 | Johnson et al. . | |
| 5,625,869 | 4/1997 | Ngamatsu et al. . | |
| 5,633,914 | 5/1997 | Rosa . | |
| 5,655,004 | 8/1997 | Holbrook | 455/411 |
| 5,713,072 | 1/1998 | Marth et al. . | |
| 5,715,518 | 2/1998 | Barrere et al. | 455/49.1 |
| 5,748,722 | 5/1998 | Lee | 379/160 |
| 5,748,742 | 5/1998 | Tisdale et al. | 380/49 |
| 5,758,277 | 5/1998 | Hawkes | 455/410 |
| 5,770,846 | 6/1998 | Mos et al. . | |
| 5,777,558 | 7/1998 | Pennypacker et al. | 340/635 |
| 5,790,645 | 8/1998 | Fawcett et al. | 379/189 |
| 5,805,674 | 9/1998 | Anderson, Jr. | 379/93.03 | ns.
DETECTION AND PREVENTION OF CHANNEL GRABBING IN A WIRELESS COMMUNICATIONS SYSTEM

TECHNICAL FIELD

The present invention relates to wireless communications systems, and more particularly, to detection and prevention of fraudulent access to the cellular telephone network.

BACKGROUND OF THE INVENTION

Cellular telephone fraud is a major problem faced by every cellular service provider today. One popular fraud scheme is called "cloning." A pirate monitors a control channel of the cellular telephone network, and during a call set-up process of an authorized cellular telephone, obtains its electronic serial number (ESN) and mobile identification number (MIN) which are transmitted over the control channel. The pirate then programs the ESN and MIN into another cellular telephone for illegal access to the cellular telephone network.

One current solution to the cloning fraud problem has been to require a separate personal identification number (PIN) during a call set-up process. While use of the PIN is inconvenient for a valid subscriber, it does makes access to the cellular telephone network more difficult. Another solution to cloning is to use an electronic fingerprint identification technique which is expected to be widely used in the near future. With the recent advent of these solutions to cloning fraud, it is anticipated that the pirates will try to find other methods to gain illegal access to the cellular telephone network.

One potential method recognized by the applicants is that a pirate may be able to simply "grab" or steal an active voice channel that is already being used by a valid subscriber. Either due to proximity to the cell site or relatively high power output, the pirate's cellular telephone can grab the voice channel simply by transmitting on the same voice channel. Then a well-known feature such as call conferencing is used to gain access to the cellular telephone network. Using the call conferencing feature, the pirate can now place a call to anywhere in the world. This channel grabbing method completely bypasses the call set-up process that occurs on the control channel and offers the pirate more anonymity and flexibility than the cloning fraud scheme. Moreover, only minor modification to most standard cellular telephones is necessary to convert any telephone into an unauthorized channel grabbing cellular telephone. Thus, the channel grabbing technique may provide pirates with an attractive alternative to cloning fraud. The applicants anticipate a large number of pirates will start using the new technique in the near future.

Therefore, it can be appreciated that there is a significant need for a method and system for detecting channel grabbing in a cellular telephone network. Once channel grabbing is detected, there is also a need to provide a technique to prevent the channel grabber from placing a telephone call. The present invention provides these and other advantages as will be illustrated by the following description and accompanying figures.

SUMMARY OF THE INVENTION

According to one preferred embodiment of the present invention, there is provided a method of detecting an unauthorized access to a voice channel assigned to an authorized cellular telephone in a cellular telephone network. Initially, RF signals transmitted to and from the authorized cellular telephone over the control and voice channels are monitored to track call processing activities and obtain various data that are used to detect potential fraudulent access to the voice channel. The data may include such things as a received signal strength indicator of the RF signal, change power output messages and responses, and hook-flash signals. In the preferred embodiment, the present invention detects two events from the data.

The first event is an unexpected shift from an expected predetermined value or lack of a shift to an expected predetermined value in the voice channel RF signal. For example, one unexpected shift is a sudden upward shift in the RF signal strength indicating that a pirate is now transmitting on the same voice channel. Another unexpected shift is a phase shift of either the RF signal or the SAT signal contained in the RF signal indicating that the pirate's unauthorized cellular telephone is also transmitting on the same voice channel. The present invention also detects an absence of an expected shift in the RF signal strength that corresponds to the change power level message transmitted from the cellular telephone network. For example, the network may send a power down message indicating that the received signal strength is too high. Once the voice channel is grabbed by the pirate's telephone, however, it will probably not comply with the command. Accordingly, the received signal strength does not shift down to an expected predetermined signal strength value.

The second event the present invention detects is the receipt of a communication, such as a hook-flash signal, that is indicative of a request to establish a new telephone connection. When both the communication indicative of the request to establish the new telephone connection and an unexpected change or lack of an expected change in the RF signal are detected, the present invention determines that an unauthorized access to the voice channel is in progress.

DETAILED DESCRIPTION OF THE INVENTION

Figure 1:
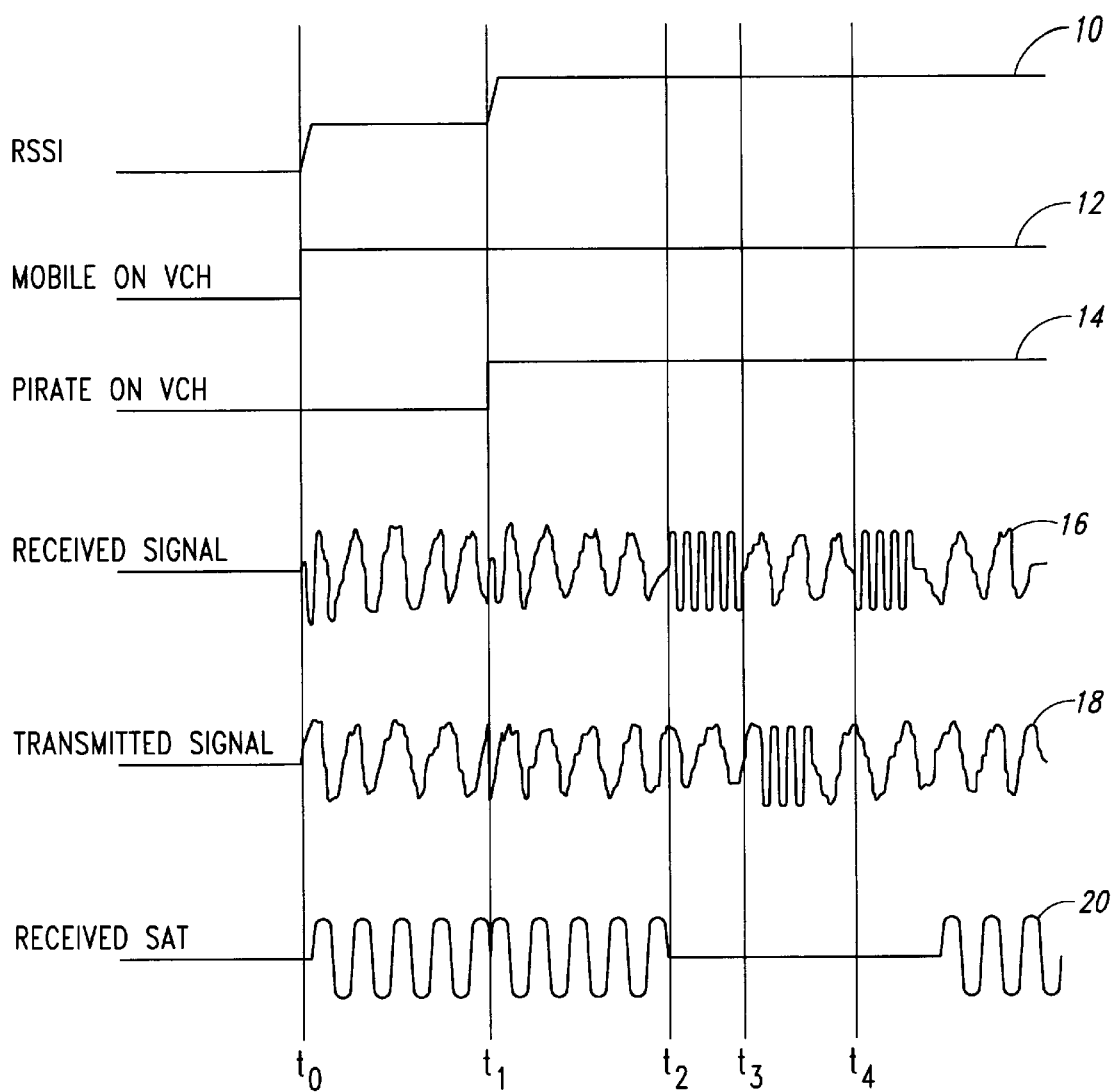
FIG. 1 is a set of event charts and various waveforms illustrating a channel grabbing technique.

For clarity, the present invention is described in a cellular telephone system environment. However, persons of ordinary skill in the art will appreciate that the techniques described herein may be used in any other types of wireless voice communications systems including personal communications services (PCS) systems, and specific multi-user radio (SMR) systems. Also it should be understood that the invention can be used with wireless telephone devices that may transmit voice such as cellular telephones or data such as data modems. The term telephone as used herein is intended to include devices for wireless voice and data communications.

For a full understanding of the scope of the present invention, call processing protocols of the cellular telephone system will now be briefly described. When a cellular telephone call is originated, either making or receiving the call, the origination takes place on a full duplex radio control channel. This control channel relays identification, MIN and ESN, from the cellular telephone to a cell site through a 10 KHz Manchester encoded data message on a reverse control channel (RECC) frequency. This mobile identification data along with other received mobile data is used to validate that the cellular telephone is authorized access to the cellular telephone system. Upon validation of the cellular telephone, the cell site control channel sends a 10 KHz Manchester encoded data message to the cellular telephone on the forward control channel frequency (FOCC), assigning the call to a full duplex voice channel. This process is referred to as a call set up. The cellular telephone retunes to the assigned voice channel and enables the conversation portion of the call to begin.

While tuned to a voice channel the cellular telephone constantly receives a specific audio frequency signal modulated onto the forward voice channel frequency (FOVC) from the transmitter at the cell site. This signal, referred to as Signaling Audio Tone (SAT), is one of three frequencies (5970 Hz, 6000 Hz, or 6030 Hz). These frequencies are outside the normal voice frequency band of cellular (300 Hz–3000 Hz), so during normal conversation on the voice channel neither the subscriber of the cellular telephone nor the other party is able to hear these signals due to filtering in the audio circuits of the cellular telephones and the cellular telephone system. The received SAT frequency is continually transponded to the cell site by the cellular telephone modulating this same SAT onto the reverse voice channel frequency (REVC). If the cellular telephone is instructed by the cellular telephone system to change to a new voice channel at another cell site (referred to as a hand-off), the cellular telephone retunes to the new voice channel and begins receiving the new SAT transmitted on the new voice channel, transponding the new SAT.

The purpose of the SAT is twofold. First, it is used to help prevent co-channel interference problems. Typically, the frequency plan of a cellular telephone system is designed to keep co-channel cellular telephone transceivers as far apart as practical. However, it is usually impractical to entirely prevent co-channel interference. Therefore, assigning a different SAT to the two cellular telephone transceivers operating on the same voice channel which are near enough to each other to have possible interference helps to minimize the effects of the interference as explained below. On a cellular voice channel, when a signal is received which does not contain the correct SAT, the received audio is muted to prevent a party from hearing a conversation not intended for him. This also applies to data or other signals being received. In other words, if a cell site receives a disconnect tone (1.8 second burst of 10 KHz) from a mobile which is sending the wrong SAT, the cell site ignores the disconnect signal and assumes that the disconnect tone was unintentionally received as co-channel interference.

The second purpose of the SAT is for determining the presence of RF continuity on a voice channel. If a cellular telephone receiver does not see the correct SAT for more than a specified amount of time on the FOVC, it releases the call. Additionally, a cell site voice channel transceiver detects the presence of the proper cellular telephone by determining that the correct SAT is present on the REVC along with some minimum received RF signal strength.

The normal manner in which the cellular telephone ends a call is by sending a burst of 10 KHz audio message, which is known as a signaling tone, or ST to the cell site on the REVC for 1.8 seconds. This burst of ST must be accompanied by the correct SAT or it will be ignored by the cell site voice channel transceiver. When the cell site voice channel transceiver receives the 10 KHz burst, it times the burst to determine its duration (ST is sent for various other durations, for example, it is also used to signal hook flashes and other conditions). The cell site voice channel transceiver also checks to see that the proper SAT is present during the ST burst. If the ST burst is determined to be 1.8 seconds in duration while the correct SAT is present, the transmitter of the cell site voice channel transceiver is turned off, and the call is released (the cellular switch ends connection with the other party).

The cell site voice channel transceiver is also capable of forcing the cellular telephone to end a call in progress by sending a call termination command to the cellular telephone (on the FOVC) in the form of a Manchester encoded 10 KHz data message. It is important to note that when a 10 KHz data message is sent either by the cellular telephone (on the REVC) or the cell site voice channel transceiver (on the FOVC), the SAT is temporarily turned off for the duration of the message (usually less than 100 ms).

Cellular protocol allows a feature known as call conference. This feature involves connecting two simultaneous conversations to a cellular telephone subscriber. This is accomplished by causing the cellular switch to receive certain signals from the cellular telephone. When a cellular telephone has a call in progress to an original party, the cellular telephone subscriber can dial a new telephone number of a new party on the cellular telephone's keypad, then press the send key. This causes the cellular telephone to send a 500 ms burst of ST (hook-flash) on the REVC. The cell site voice channel transceiver then responds by sending a 10 KHz data message to the cellular telephone on the FOVC, requesting the cellular telephone to send the new dialed digits to the cell site. At this point, the cellular switch puts the originally connected party on hold, muting their audio. The cellular telephone then sends a 10 KHz data message on the REVC containing the dialed digits. The cellular switch receives these dialed digits from the cellular telephone and attempts to connect the cellular telephone subscriber to the new party. At this point, if the cellular telephone subscriber presses the send key again (sending a 500 ms ST burst on the REVC), the original party is included in a three way conversation with the cellular telephone subscriber and the new party. Various actions can be taken at this point (depending on the cellular switch vendor) which affect the connections of the parties.

Also provided for by cellular protocol is the well known call waiting feature. This feature is used to allow a cellular telephone subscriber to receive a second call while a first call is already in progress. If a call is received by the cellular switch for a cellular telephone, which is already involved with a call in progress, then the cell site voice channel transceiver sends a notification beep on the FOVC to the cellular telephone. The cellular telephone subscriber can answer the second incoming call by pressing the send key on his cellular telephone (sending a 500 ms ST burst on the REVC). When this ST burst is detected by the cell site voice channel transceiver, the cell site sends a data message to the cellular switch which in turn puts the originally connected party on hold and connects the new party to the cellular telephone subscriber. Note that since the switching center is where the connection change takes place, the cellular telephone is able to continue the connection with the new party using the same cell site voice channel transceiver it was on when the new call arrived. The cellular telephone subscriber can toggle between the two calls by pressing the send key on his telephone (sending a 500 ms burst of ST on the REVC). This summarizes the cellular call processing protocols.

Referring to FIG. 1, one possible channel grabbing technique will now be described. A valid subscriber uses an authorized cellular telephone to place a call. During the call set-up process, a cell site verifies the cellular telephone's MIN and ESN. Once verified, the cell site transmits a data message containing the assigned voice channel and initial power output of the cellular telephone. The authorized cellular telephone receives the data message, tunes to the assigned voice channel at $t=t_0$, begins transmitting on the voice channel as shown in signal 12, and waits for a called party to answer. At the same time, an RSSI level shown in signal 10 shows an upward shift. At $t=t_0$, the cellular telephone looks for the SAT signal and transponds the received SAT signal to the cell site as shown by the SAT signal 20. At some time between $t_0$ and $t_1$, the called party answers and normal conversation takes place on the assigned voice channel. The received signal 16 represents a demodulated RF signal, with the SAT signal filtered out, transmitted from the cellular telephone to the cell site. The transmitted signal 18 represents an unmodulated signal transmitted from the cell site to the cellular telephone. At $t=t_1$, a pirate is shown grabbing the assigned voice channel by transmitting on the same voice channel frequency as shown in signal 14. To grab the assigned voice channel, the pirate's cellular telephone needs to capture the discriminator of the voice channel transceiver. The pirate achieves this by either locating his cellular telephone very close to the cell site or transmitting above the legal power level. Thus, the RSSI level as shown in signal 10 shows a sudden upward shift at $t=t_1$. At $t=t_1$, the SAT signal 20 shows a significant phase shift because the SAT signal is now being transmitted by the pirate's cellular telephone. The phase shift also occurs on the received RF signal (not shown). Once the pirate grabs the voice channel and captures the discriminator, the cell site receives the received signal 16 only from the pirate's cellular telephone. Thus, at any time after $t=t_1$, the valid subscriber can hear the called party while the called party cannot hear the valid subscriber. Instead, the called party hears the pirate talking and the valid subscriber also hears the pirate. At $t=t_2$, the pirate causes his telephone to send a 500 ms burst of ST (hook-flash signal) message on the reverse voice channel.

The phrase "hook-flash" is intended to include any signal to the cellular telephone network that requests a new telephone connection. For example, certain credit cards or calling cards allow the valid subscriber to disconnect a called party by pressing the pound (# sign) key. This allows the valid subscriber to receive a dial tone to establish a new call without having to redial an authorization number. A pirate may wait for a calling card call from the valid subscriber, wait until the authorization number is entered, and grab the voice channel by capturing the discriminator of the voice channel transceiver. Once the pirate grabs the channel, he can send a "hook-flash signal" by pressing the pound key to obtain a second dial tone. The second dial tone now allows the pirate to place a call anywhere in the world. Of course, the valid subscriber of the cellular telephone will receive the bill for the call, not the pirate.

In response to the ST hook-flash signal, the cell site puts the original called party on hold and at $t=t_3$, transmits a 10 KHz data message to the cellular telephone on the forward voice channel to request dialed digits. In response, at $t=t_4$, the pirate's cellular telephone transmits a 10 KHz data message on the reverse voice channel containing the dialed digits. During transmission of data messages, the cell site turns off the SAT signal as shown by the received SAT signal 20 between $t=t_2$ and $t_4$.

Figure 2A:
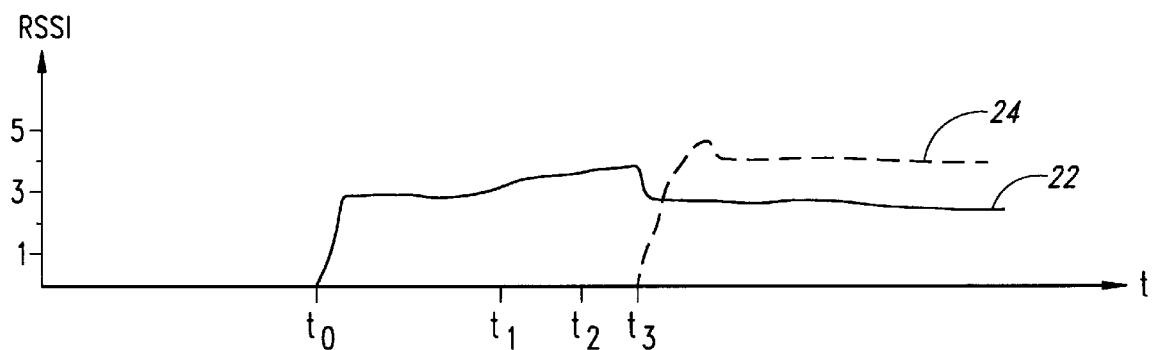
FIGS. 2A and 2B are graphs of signal strengths of RF signals received from the cellular telephones illustrating alternative channel grabbing techniques.

FIG. 2A illustrates an alternative channel grabbing technique that may be used by the pirate in an attempt to avoid detection. At $t=t_0$, an authorized cellular telephone starts transmitting on the assigned voice channel. The signal 22 represents the RSSI of the cellular telephone as received by the cell site. Between $t=t_0$ and $t_1$, the cellular telephone transmits at a power level initially assigned to it by the cell site. The power level corresponds to an expected RSSI level of 3 as shown. The expected RSSI level may be derived from past transmissions of the cellular telephone on the control channel. At $t=t_1$, the RSSI of the signal 22 increases from level 3 to level 4, signifying that the cellular telephone is moving closer to the cell site. At $t=t_2$, the cell site transmits a power down command to decrease the power output level of the cellular telephone. In response, at $t=t_3$, the cellular telephone reduces its power output by an amount that corresponds to the power down command from the cell site. The RSSI for the signal 22 should decrease to level 3 which corresponds to the new assigned power level contained in the power down command. However, at $t=t_3$, a pirate is shown starting transmission on the voice channel and overpowering the authorized cellular telephone. To capture the discriminator of the voice channel transceiver at the cell site, the pirate's cellular telephone either transmits at a higher power level than the authorized cellular telephone or is located in close proximity to the cell site. Once the pirate grabs the voice channel, the cell site registers a RSSI of the pirate's cellular telephone rather than that of the authorized cellular telephone. The RSSI of the pirate's cellular telephone is shown as a signal 24. The signal 24 settles at approximate level 4.5 and is much higher than the expected RSSI level of 3 from the signal 22 of the authorized cellular telephone when the signal 24 is absent.

Figure 2B:
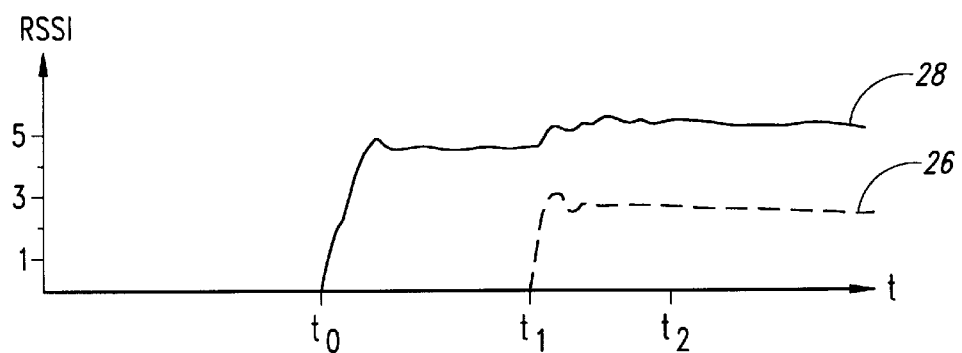

FIG. 2B illustrates another alternative channel grabbing technique and represents a scenario in which the pirate's cellular telephone starts transmitting on the assigned voice channel before the authorized cellular telephone can tune to the assigned voice channel. A signal 28 represents the RSSI of the pirate's cellular telephone and a signal 26 represents the RSSI of the authorized cellular telephone in the absence of transmission by the pirate's cellular telephone. Some time before $t=t_0$, the cell site assigns a voice channel and an initial power level to the authorized cellular telephone. The initial power level corresponds to an expected RSSI level of 3. At $t=t_0$, however, the pirate's cellular telephone jumps to the voice channel before the authorized cellular telephone and transmits at a much higher power level than the initial power level assigned to the authorized cellular telephone. Thus, the RSSI at the cell site indicates an unexpected level of 5. At $t=t_1$, the authorized cellular telephone starts transmitting with the initial power level that corresponds to an RSSI level of 3 as shown by the signal 26. The actual RSSI at the cell site at $t=t_1$, however, is at level 5 or above depending on whether the transmissions of the pirate's cellular telephone and the authorized cellular telephone are in phase or not. Because the cell site would like to see an RSSI level of approximately 3 rather than 5 or higher, the cell site may send a power down command in order to decrease the RSSI level. The pirate's cellular telephone, however, may acknowledge the power down command but does not actually comply with the command because the authorized cellular telephone may recapture the discriminator of the voice channel transceiver and grab the channel away from the pirate's cellular telephone. While FIGS. 1, 2A and 2B show only three possible channel grabbing techniques, persons of ordinary skill in this art will appreciate that there are many others that may be used by pirates. For example, rather than to try to grab the voice channel in response to a power down command as shown in FIG. 2A, the pirate may try to grab the voice channel in response to a power up command in order to improve his chance of avoiding detection by the cell site.

Figure 3:
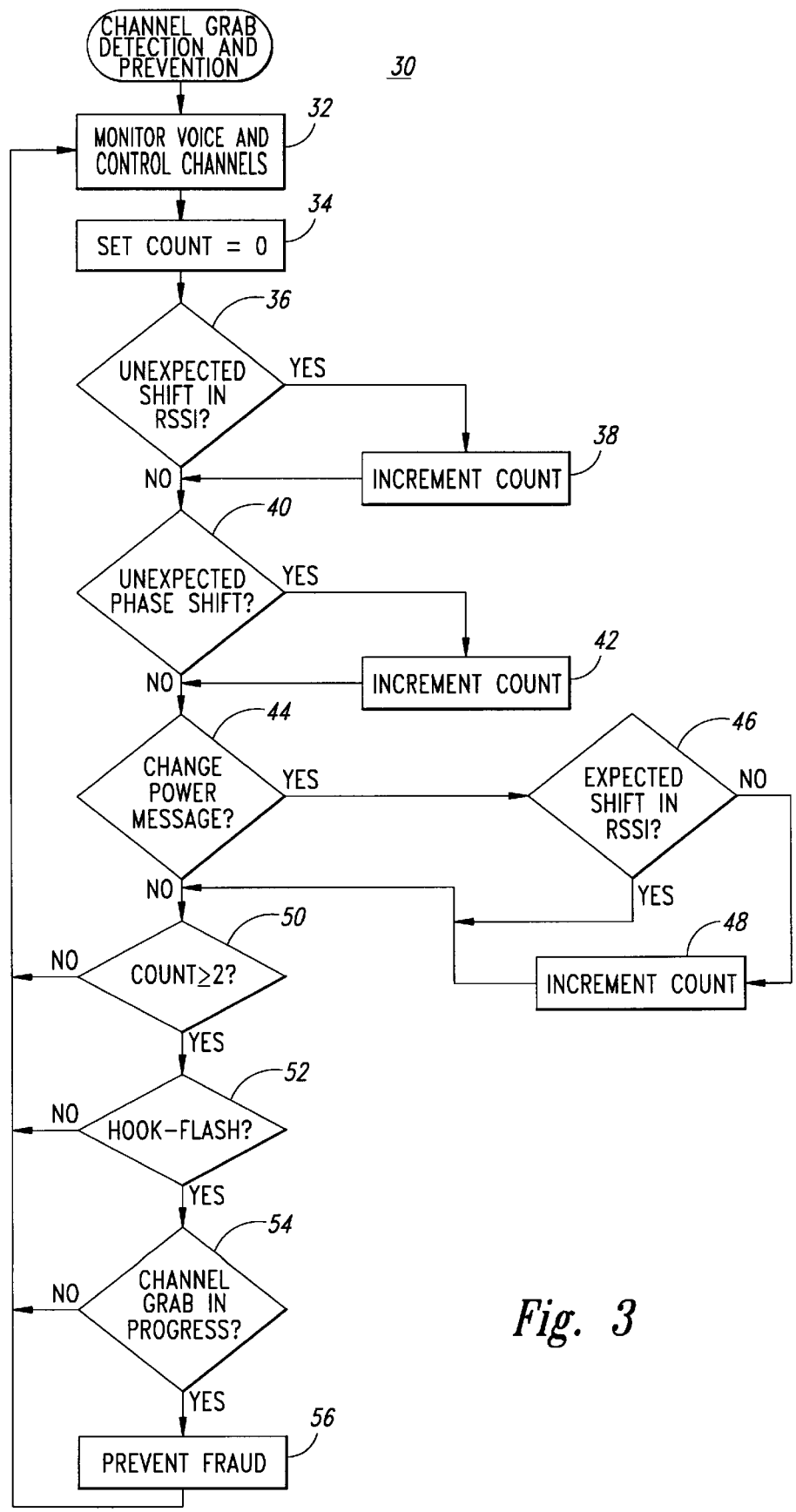
FIG. 3 is a flow chart of a channel grab detection and prevention routine according to the present invention.

FIG. 3 is a flowchart of a channel grab detection and prevention routine 30 according to the present invention. At step 32, the routine 30 monitors the control and voice channels of the cell site and temporarily stores various call activity data as will be explained in more detail later with reference to FIG. 4. From the control channel, the routine 30 monitors such data messages as change power level commands, voice channel assignments, initial power level, and SAT frequencies. From the voice channels, the routine 30 monitors such data messages as signaling tones, RSSI, and phase shift of received RF signals and SAT frequencies. Preferably, these data are monitored and stored in real time.

At step 34, a count variable "count" is set to zero. At decision 36, the routine 30 looks for an unexpected shift in the RSSI level of a voice channel. One typical unexpected event is illustrated in FIG. 1 at time $t=t_1$. In that case, there is a sudden upward shift in the RSSI level from an expected predetermined RSSI value of 3 in the absence of a power up command. Another example of an unexpected shift event is illustrated in FIG. 2B at $t=t_0$. In that case, the cell site expects an upward RSSI shift from level 0 to an expected level of 3 based on past transmission characteristics of the authorized cellular telephone and the initial power level setting transmitted to the authorized cellular telephone. Instead, the RSSI level unexpectedly shifts from level 0 to level 5 beyond the expected level of 3. Another example of an unexpected shift event is when the cell site transmits a power down command but the RSSI level decreases by an amount that is less than expected. In order to improve his chance of avoiding detection by the cell site, a sophisticated pirate may transmit at a power level that is just sufficient to capture the discriminator of a voice channel. For example, assume that the cell site transmits a power down command and expects the RSSI to decrease from level 4 to level 2. Further assume that the pirate's cellular telephone begins transmitting and captures the discriminator of an assigned voice channel of an authorized cellular telephone. Rather than a shift of the RSSI to a predetermined expected level of 2, the RSSI may drop to level 3 which is unexpected.

If an unexpected shift in the RSSI level is detected, control passes to step 38 where the routine 30 increments the variable "count" by one. At decision 40, the routine 30 looks for an unexpected phase shift in either the received RF signal or the SAT signal or both. An example of an exaggerated 180 degree phase shift event for the SAT signal 20 for purposes of illustration is shown in FIG. 1 at $t=t_1$. A similar phase shift event may be observed for the received RF signal (not shown). If an unexpected phase shift is detected, control passes to step 42 where the variable "count" is incremented by one. At decision 44, the routine 30 looks for a change power level message, either a power down or power up command, transmitted from the cell site to the cellular telephone. If the transmission of the change power level message is detected, control passes to another decision 46. At decision 46, the routine 30 looks for an expected shift in the RSSI level in response to the change power level message. If the RSSI shifts to a predetermined expected value, control passes to decision 50. If the RSSI does not shift to the predetermined expected value, however, it is another indication that a potential channel grab by a pirate may be in progress and control passes to step 48. At step 48, the routine 30 increments the variable "count" by one and passes control to decision 50. The decision 50 checks to see whether there are at least two unexpected shift events as determined by steps 36–48. If not, control passes back to step 32 and the process of detecting unexpected shift events (steps 32–50) is repeated.

If there were at least two unexpected shift events for the particular cellular telephone call being monitored on the assigned voice channel, it signifies that there is a strong likelihood that a channel grabbing attempt is occurring and control passes to decision 52. While the routine 30 checks for a "count" value of at least two, persons of ordinary skill in the art will appreciate that the "count" value may be compared with one or three depending upon the certainty of the determination of the channel grabbing attempt.

At decision 52, the routine 30 checks for receipt of a hook-flash signal following the unexpected shift events to further confirm that a channel grab attempt is occurring. As indicated previously, the hook-flash signal includes the 500 ms ST, pound key, and any other signal to the cellular telephone network which allows the cellular telephone to place a call through the network. If there was no hook-flash signal, the routine 30 assumes that the unexpected shift events are caused by radio frequency interference or the like, and control passes back to step 32. If a hook-flash signal is detected, control passes to decision 54. At decision 54, additional checks may be combined with the routine 30 to reduce the likelihood that the unexpected shift events and the hook-flash signal are due to factors other than the channel grabbing attempt by a pirate. One method is to collect the dialed digits after the hook-flash signal and compare them against a known fraudulent destination calls database. Another possible method is to use a pre-established database of electronic fingerprints of all authorized cellular telephones. The fingerprint of the authorized cellular telephone that originated the initial call can be obtained from the database and compared against a fingerprint of a cellular telephone that is transmitting on the voice channel. If channel grabbing is determined to be in progress, control passes to step 56. Otherwise, control passes back to step 32.

At step 56, the routine 30 takes steps to prevent completion of the fraud. Initially, the routine 30 prevents dialed digits of the pirate's cellular telephone from entering the cellular switching system. The routine 30 may also store the dialed digits from the pirate for future use in updating the known fraudulent destination calls database, performing destination analysis, informing law enforcement officers, or the like. Next, the routine 30 disconnects the pirate's cellular telephone using one of several methods. Methods of forcing the rerouting or termination of a call in progress are described later with reference to FIG. 5.

Figure 4:
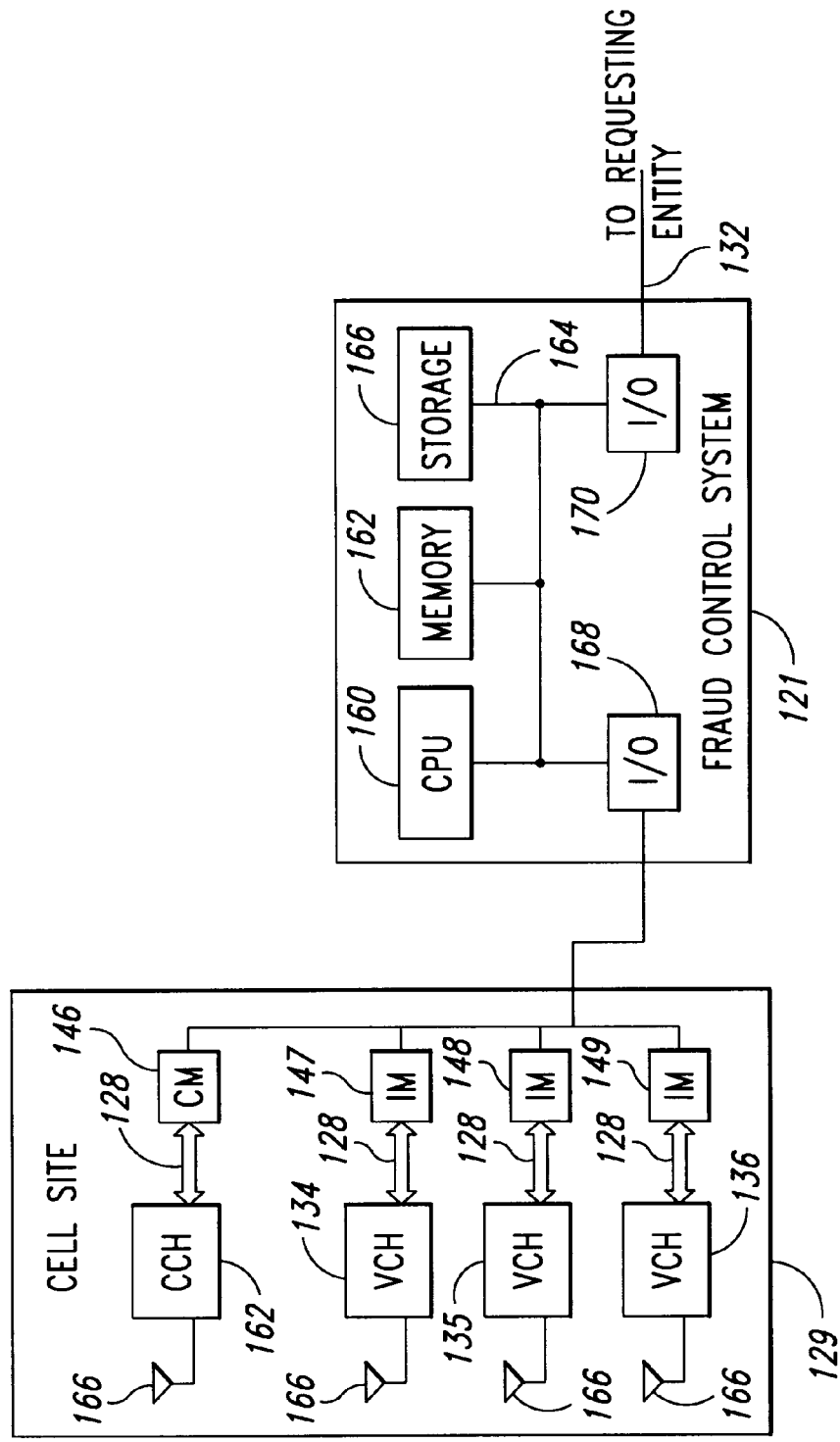
FIG. 4 is a functional block diagram of a fraud control system according to the present invention.

FIG. 4 is a functional block diagram of a fraud control system 121 according to the present invention. A processor (CPU) 160 is connected to a memory 162 through a control and data bus 164. The memory 162 stores the channel grab detection and prevention routine 30 of FIG. 3 and a call activity database containing the data used by the routine. A permanent storage device 166 connected to the bus 164 permanently stores various data related to fraud control. The storage device 166 may also contain a permanent copy of the routine 30 for purposes of software updates and initial loading of the routine into the memory 162. The fraud control system 121 is shown connected to a single cell site 129, but the system is more typically connected to many cell sites.

A control channel interface module 146 of the cell site 129 monitors mobile communications with a control channel transceiver 162 connected to a cell sector antenna 166 using a module interface bus 128 connected between the control channel interface module 146 and the control channel transceiver 162. These communications include call attempts, registrations, page responses, voice channel assignments, initial power output assignment, and continuous RSSIs. The data collected by the control channel interface module 146 is sent directly to fraud control system 121 via a data communications circuit 168, allowing the processor 160 to monitor the call activity in real time.

Mobile communications with voice channel transceivers 134–136 through cell sector antenna 166 are monitored by voice channel interface modules 147–149, with each voice channel interface module connected by a corresponding module interface bus 128 to a corresponding one of the voice channel transceivers. These communications include hand-off command messages and responses, power-up and power-down command messages and responses, call termination or end signals to and from the cellular telephone, continuous demodulated signal from the cellular telephone, and continuous RSSIs and transmit key conditions of the voice channel.

The data collected by the voice channel interface modules 147–149 are sent directly to the fraud control system 121 via the data communications circuit 168, allowing the processor 160 to update and monitor in real time the call activity data base stored in the memory 162. Each of the voice channel transceivers 134–136 in the cell site 129 is physically connected to a corresponding one of the voice channel interface modules 147–149. Each of the voice channel interface modules 147–149 is identical in form and operation with the exception of its module-ID.

A requesting entity such as a cellular telephone service provider can communicate with the fraud control system 121 through a communications port 170 and a data communications line 132. In this way the requesting entity can choose to receive copies of real-time pre-call, mid-call, and post-call data flowing between the fraud control system 121 and the control interface module 146 or any of the voice channel interface modules 147–149 which are connected to the fraud control system 121. These real-time pre-call, mid-call, and post-call data can then be used for a variety of other applications by the requesting entity. The requesting entity can also send command messages to the processor 160 over the data communications line 132 and the communications port 170, such as an instruction with a specified interruption for a specified call.

Figure 5:
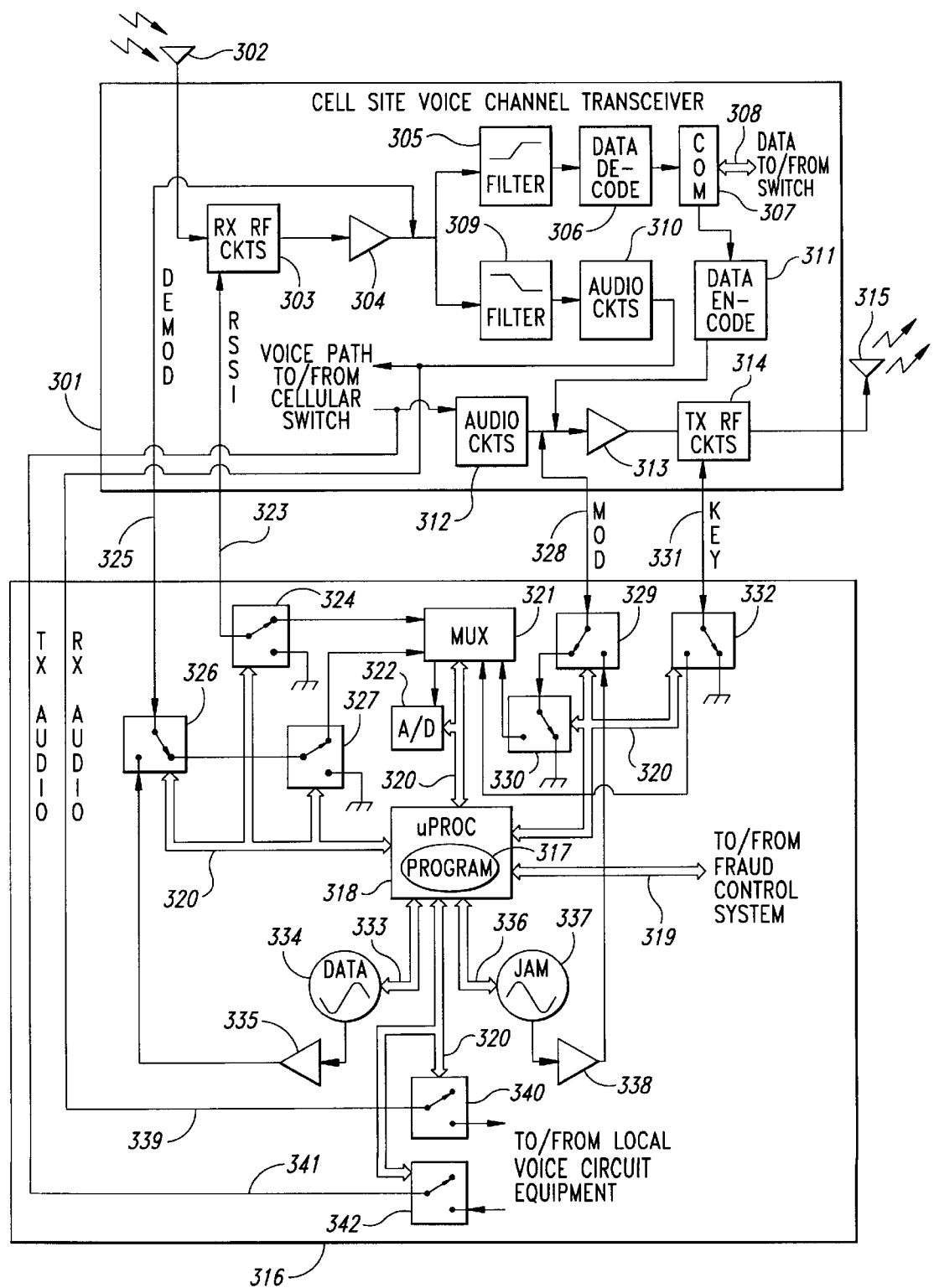
FIG. 5 is a functional block diagram of cell site voice channel interface circuits of FIG. 4.

FIG. 5 is a functional block diagram of a representative one of the voice channel interface modules 147–149 of FIG. 4, referred to in FIG. 5 as a voice channel interface module 316. As discussed above, the voice channel interface module 316 is physically interfaced to one of the voice channel transceivers 134–136 at the cell site 129, referred to in FIG. 5 as a voice channel transceiver 301. As shown, there are six separate interface points between voice channel interface module 316 and voice channel transceiver 301. These are an RSSI signal interface line 323, a demodulator signal interface line 325, a modulator signal interface line 328, a transmitter key signal interface line 331, a receive audio interface line 339, and a transmit audio interface line 341.

In operation, a cellular telephone's RF signal arriving at a cell sector receive antenna 302 of the voice channel transceiver 301 propagates into receiver RF circuits 303 where the RSSI of the RF signal is measured and generated by a RSSI generator (not shown) while the RF signal is converted to the intermediate frequency (IF) according to well known RF receiver technology. In this embodiment, the RSSI generator is integrated into the receiver RF circuits 303. The RSSI signal is monitored by the voice channel interface module 316 through the RSSI signal interface line 323, providing the voice channel interface module 316 with continuous RSSI signals as they are measured by the voice channel transceiver 301. After being processed by receiver RF circuits 303, the IF signal is sent to a demodulator 304 where the baseband signal, audio in this case, is derived. The output of the demodulator 304 is monitored by the voice channel interface module 316 through the demodulator signal interface line 325, providing the voice channel interface module 316 with all baseband signals demodulated by the voice channel transceiver 301.

In the voice channel transceiver 301, the signal output from the demodulator 304 is split into two paths. The first path takes the signal to the input of a high pass filter 305 which passes the high frequency SAT and data portion of the signal to a Manchester data decoder 306. The Manchester data decoder 306, which may be used to implement step 40 of FIG. 3, converts the 10 KHz analog Manchester encoded signal into digital signal bits as well as detecting the incoming SAT phase. Both of these information outputs are then fed to a communications port 307 for passage to the cellular switch via a data communications line 308. The second path for the output signal from the demodulator 304 is through a low pass filter 309 which passes only the voice portion of the signal to receive baseband audio circuits 310 for further transmission to the cellular switch and, eventually, the party connected to the call. A receive audio interface line 339 taps the voice signal at this point and provides that signal to the voice channel interface module 316.

The transmit signals path through the voice channel transceiver 301 has two origination sources. First, the cellular switch sends data to the voice channel transceiver 301 via the data communications line 308 into the communications port 307 for passage to a Manchester data encoder 311. The Manchester data encoder 311 converts the data from the cellular switch into Manchester encoded analog signals which are sent to the input of a modulator 313 mixed with a specified SAT tone. The modulator signal interface line 328 connects the input of the modulator 313 to the voice channel interface module 316.

A second input received by the modulator 313 is a voice signal which originates with the party connected to the call. The voice signal from the cellular switch arrives at the input of a transmit baseband audio circuits 312. The transmit audio interface line 341 connects the input of the transmit baseband audio circuits 312 to the voice channel interface module 316. The voice signal is then processed by transmit baseband audio circuits 312 before reaching the input of the modulator 313. The output of the modulator 313 is sent to the input of transmit RF circuits 314 which convert the baseband signals to the operating RF transmit frequency using conventional technology. The transmitter key signal interface line 331 connects the voice channel interface module 316 to the well known transmitter keying signal used in the transmit RF circuits 314. After being converted and amplified in the transmit RF circuits 314, the RF signal is sent out cell sector transmit antenna 315 for propagation to the cellular telephone operating on the voice channel.

The operation of the voice channel interface module 316, shown in FIG. 5, will now be described. A program 317 operating in a microprocessor 318 communicates with the fraud control system 121 via a data communications line 319 for receiving command messages from the fraud control system and providing data to the fraud control system. The microprocessor 318 controls the operation of digitally controlled analog switches 324, 326, 327, 329, 330, 332, 340, and 342 via a control and data bus 320. The microprocessor 318 also controls the operation of a Manchester data and signaling tone signal generator 334 via a signal generator control bus 333. The microprocessor 318 additionally controls the operation of a Manchester data jamming signal generator 337 via a signal generator control bus 336. The microprocessor 318 additionally controls the operation of a multiplexer 321 via the control and data bus 320. The microprocessor 318 additionally reads the digital output of an analog to digital converter 322 via the control and data bus 320. Substantially all operations performed by the voice channel interface module 316 are controlled by the program 317 operating in the microprocessor 318.

The voice channel interface module 316 keeps a continuous status of many conditions relating to the voice channel transceiver 301 and performs many individual tasks relating to detection and prevention of channel grabbing. The functional operations of the voice channel interface module 316 as they relate to monitoring the status of the voice channel transceiver 301 will now be described.

In one state, the digitally controlled analog switch 324 passes signals from the RSSI signal interface line 323 to an input of the multiplexer 321. The multiplexer 321 switches these signals to the analog to digital converter 322 which digitizes these and communicates its digital representations of them to the microprocessor 318 via the control and data bus 320. In this manner, the microprocessor 318 can continually update a status of this condition.

In one state, the digitally controlled analog switch 326 passes signals from the demodulator signal interface line 325 to the digitally controlled analog switch 327 which, when in one state, passes these signals to an input of the multiplexer 321. The multiplexer 321 switches these signals to the analog to digital converter 322 which digitizes these signals and communicates their digital representations to the microprocessor 318 via the control and data bus 320. In this manner, the microprocessor 318 can continually read these signals into a memory. The program 317 operating in the microprocessor 318 can then analyze these signals and decode any received Manchester encoded data signals, dual-tone multi-frequency (DTMF) signals, Signaling Tones (ST), SAT, or any number of other analog signals seen on the demodulator signal interface line 325. Accordingly, the analog to digital converter 322 and the program 317 act as a data decoder that is used to detect various shift events and hook-flash signals as described in FIG. 3. The program 317 may also monitor and detect unexpected phase shift of the SAT signal from the digitized signal. In this manner, the status of any conditions related to these signals can be updated continuously for analysis by the program 317 running on the microprocessor 318.

In one state, the digitally controlled analog switch 329 passes signals from the modulator signal interface line 328 to the digitally controlled analog switch 330 which, when in one state, passes these signals to an input of the multiplexer 321. The multiplexer 321 switches these signals to the analog to digital converter 322 which digitizes these signals and communicates their digital representations to the microprocessor 318 via the control and data bus 320. In this manner, the microprocessor 318 can continually read these signals into its memory (not shown). The program 317 operating in the microprocessor 318 can then analyze these signals and decode any received Manchester encoded data signals, dual-tone multi-frequency (DTMF) signals, Signaling Tones (ST), SAT, or any number of other analog signals seen on the modulator signal interface line 328. In this manner, the status of any conditions related to these signals can be updated continuously.

In one state, the digitally controlled analog switch 332 passes signals from the transmitter key signal interface line 331 to an input of the multiplexer 321. The multiplexer 321 switches these signals to the analog to digital converter 322 which digitizes these signals and communicates their digital representations to the microprocessor 318 via the control and data bus 320. In this manner, the microprocessor 318 can continually update a status of this condition.

While the channel grab detection and prevention routine 30 of FIG. 3 resides in the fraud control system 121, it is to be understood that a portion or all of the routine may be performed by the microprocessor 318 in the voice channel interface module 316.

The tasks which the voice channel interface module 316 performs relating to prevention of channel grabbing step 56 of FIG. 3, are described below.

One task which is performed by the voice channel interface module 316 is that of shorting the signal from the demodulator signal interface line 325 to ground, effectively removing any demodulated base band signals from the output of the demodulator 304. This is accomplished by the program 317 operating in the microprocessor 318, via the control and data bus 320, commanding the digitally controlled analog switches 326 and 327 to switch to the state where the demodulator signal interface line 325 is connected to ground through digitally controlled analog switches 326 and 327. For example, during receipt of dialed digits from the pirate's cellular telephone, the microprocessor 318 shorts the demodulator signal interface line 325 to ground in order to prevent the dialed digits from reaching the cell site switching system.

Another task which is performed by the voice channel interface module 316 is shorting the RSSI signals of the voice channel transceiver 301 to ground. This is accomplished by the program 317 operating in the microprocessor 318, via the control and data bus 320, commanding the digitally controlled analog switch 324 to switch to the state where the RSSI signal interface line 323 is connected to ground through the digitally controlled analog switch 324, effectively creating an appearance to the voice channel transceiver 301 that there are no RF signals being received at the cell sector receive antenna 302.

Yet another task which is performed by the voice channel interface module 316 is connecting the signals from the receive audio interface line 339 and the transmit audio interface line 341 to the local voice circuit equipment (effectively providing a voice link between the calling party, the called party, and the local voice circuit equipment). This is accomplished by the program 317 operating in the microprocessor 318, via the control and data bus 320, commanding the digitally controlled analog switches 340 and 342 to switch to the state where the receive audio interface line 339 and the transmit audio interface line 341 are connected to the local voice circuit equipment through the digitally controlled analog switches 340 and 342. The local voice circuit equipment may be an announcement module for informing the valid subscriber that a fraud is in progress and that he will not be charged for the fraudulent call if any was made.

Yet another task which is performed by the voice channel interface module 316 is injecting a signal into modulator signal interface line 328 (effectively providing modulation signals such as Manchester encoded analog signals to the input of the modulator 313). This is accomplished by the program 317 operating in the microprocessor 318, via the control and data bus 320, commanding the digitally controlled analog switch 329 to switch to the state where the modulator signal interface line 328 is connected to the output of a buffer circuit 338 through the digitally controlled analog switch 329. After this connection is made, the program 317 operating in the microprocessor 318, via the signal generator control bus 336, commands a Manchester data jamming signal generator 337 to generate a specified signal which is buffered by the buffer circuit 338 and then supplied to the input of the modulator 313 through the digitally controlled analog switch 329 and the modulator signal interface line 328. For example, a call termination ST message may be generated to release the call in progress.

Yet another task which is performed by the voice channel interface module 316 is that of injecting a signal into the demodulator signal interface line 325 (effectively providing analog signals at the output of the demodulator 304 as though received from a cellular telephone). For example, during receipt of dialed digits from the pirate's cellular telephone, any type of an interfering signal may be generated by the signal generator 334 and inserted into the demodulator signal interface line 325 through the switch 326 to prevent completion of the fraudulent call. This is accomplished by the program 317 operating in the microprocessor 318, via the control and data bus 320, commanding the digitally controlled analog switch 326 to switch to the state where the demodulator signal interface line 325 is connected to the output of a buffer circuit 335 through the digitally controlled analog switch 326. After this connection is made, the program 317 operating in the microprocessor 318, via a signal generator control bus 333, commands a Manchester data and signaling tone signal generator 334 to generate a specified signal which is buffered by the buffer circuit 335 and then supplied to the output of the demodulator 304 through the digitally controlled analog switch 326 and the demodulator signal interface line 325.

A person of ordinary skill in this art will appreciate that proper combinations of these individual tasks performed by the voice channel interface module 316 will provide for various types of interruptions of a call operating on the voice channel transceiver 301. For example, if a fraudulent call were operating on the voice channel transceiver 301 and the program 317 operating in the microprocessor 318 received a message from the fraud control system 121 (via data communications line 319) to terminate (or end) the call, then the program 317 would cause the injection of a 1.8 second duration burst of 10 KHz (ST) signal into the demodulator signal interface line 325 (effectively providing a "disconnect request" signal at the output of the demodulator 304). This action would cause the cellular switch to receive data indicating that the cellular telephone has requested a disconnect of its call in progress on the voice channel transceiver 301. The cellular switch would then command the voice channel transceiver 301 to unkey its transmit RF circuits 314, thereby ending the connection to the cellular telephone. The changing condition of the keyed state of the transmit RF circuits 314 is detected by the program 317 operating in the microprocessor 318 (as described above) indicating that the cellular telephone is no longer in operation on the voice channel transceiver 301.

Other methods of forcing the rerouting or termination of a call in progress is described in more detail in a related application Ser. No. 08/521,797, entitled "AUTOMATED FORCED CALL DISRUPTION FOR USE WITH WIRELESS TELEPHONE SYSTEMS," filed on Aug. 31, 1995, which is incorporated herein by reference.

In a preferred embodiment, the fraud control system 121 tracks the original voice channel assignments and the initial power output level of the cellular telephone. To do so, the fraud control system 121 receives data monitored on the cellular telephone system control channels where the voice channel assignments take place.

Figure 6:
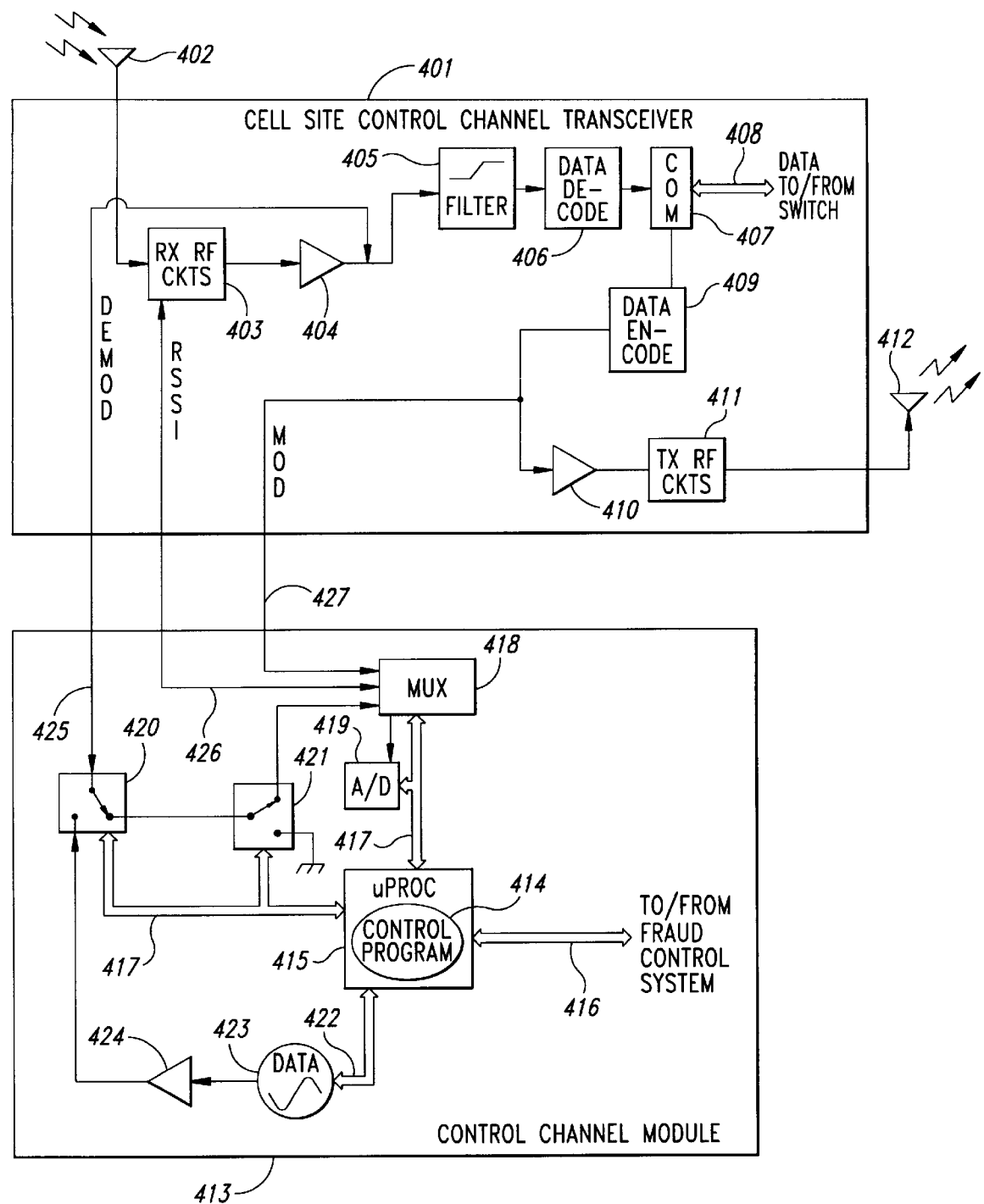
FIG. 6 is a functional block diagram of cell site control channel interface circuits of FIG. 4.

In FIG. 6, the interface of a control channel interface module 413 to a cell site control channel transceiver 401 is shown. The information monitored by a control program 414 operating in a microprocessor 415 in the control channel interface module 413 is communicated to the fraud control system 121 via a data communications line 416.

Each control channel interface module 413 is physically interfaced to a separate and unique cell site control channel transceiver 401 in the cellular telephone system. As shown, there are three separate interface points between the control channel interface module 413 and the cell site control channel transceiver 401. These are an RSSI signal interface line 426, a demodulator signal interface line 425, and a modulator signal interface line 427.

A cellular telephone's RF signal arriving at a cell sector receive antenna 402 of the cell site control channel transceiver 401 propagates into receiver RF circuits 403 where the RSSI of the RF signal is measured while the signal is converted to the intermediate frequency (IF) according to well known RF receiver technology. The RSSI signal is monitored by the control channel interface module 413 through the RSSI signal interface line 426, providing the control channel interface module 413 with continuous RSSI signals as they are measured by the cell site control channel transceiver 401. After being processed by the receiver RF circuits 403, the IF signal is sent to a demodulator 404 where the baseband signal (audio in this case) is derived. The output of the demodulator 404 is monitored by the control channel interface module 413 through the demodulator signal interface line 425, providing the control channel interface module 413 with all baseband signals demodulated by the cell site control channel transceiver 401.

In the cell site control channel transceiver 401, the signal output from the demodulator 404 is sent to the input of a high pass filter 405 which passes the high frequency data portion of the signal to a Manchester data decoder 406. The Manchester data decoder 406 converts the 10 KHz analog Manchester encoded signal into digital signal bits. This information output is then fed to a communications port 407 for passage to the cellular switch via a data communications line 408. This summarizes the normal receive signal path through the cell site control channel transceiver 401.

The path of the transmit signal through the cell site control channel transceiver 401 originates at the cellular switch. The cellular switch sends data to the cell site control channel transceiver 401 via the data communications line 408 into the communications port 407 for passage to a Manchester data encoder 409. The Manchester data encoder 409 converts the data from the cellular switch into Manchester encoded analog signals which are sent to the input of a modulator 410. At the input of the modulator 410, the modulator signal interface line 427 provides an interface for control channel interface module 413. The output of the modulator 410 is sent to the input of transmit RF circuits 411 which convert the baseband signals to the operating RF transmit frequency using conventional technology. After being converted and amplified in the transmit RF circuits 411, the RF signal is sent out using a cell sector transmit antenna 412 for propagation to the cellular telephones operating on the control channel. This summarizes the normal transmit signal path through the cell site control channel transceiver 401.

The operation of the control channel interface module 413 shown in FIG. 6 will now be described. The control program 414 operating in the microprocessor 415 communicates with the fraud control system 121 via a data communications line 416 for receiving command messages from fraud control system 121 and providing data to the fraud control system 121. The microprocessor 415 controls the operation of digitally controlled analog switches 420 and 421 via a control and data bus 417. The microprocessor 415 also controls the operation of a Manchester data and signaling tone signal generator 423 via a signal generator control bus 422. The microprocessor 415 additionally controls the operation of a multiplexer 418 via the control and data bus 417. The microprocessor 415 additionally reads the digital output of an analog to digital converter 419 via the control and data bus 417. Substantially all operations performed by the control channel interface module 413 are controlled by the control program 414 operating in the microprocessor 415.

The control channel interface module 413 keeps a continuous status of many conditions relating to the cell site control channel transceiver 401 and performs specific tasks relating to prevention of channel grabbing. The functional monitoring operations of the control channel interface module 413 will now be described.

In one state, the digitally controlled analog switch 420 passes signals from the demodulator signal interface line 425 to the digitally controlled analog switch 421 which, when in one state then passes these signals to an input of the multiplexer 418. The multiplexer 418 switches these signals to the analog to digital converter 419 which digitizes these signals and communicates their digital representations to the microprocessor 415 via the control and data bus 417. In this manner, the microprocessor 415 can continually read these signals into memory. The control program 414 operating in the microprocessor 415 can then analyze these signals, decoding any received Manchester encoded data signals seen arriving on the demodulator signal interface line 425. In this manner, the status of any conditions related to these signals can be updated continuously.

The modulator signal interface line 427 passes Manchester encoded analog signals from the data encoder 409 to an input of the multiplexer 418. The multiplexer 418 switches these signals to the analog to digital converter 419 which digitizes these signals and communicates their digital representations to the microprocessor 415 via the control and data bus 417. In this manner, the microprocessor 415 can continually read these signals into memory. The control program 414 operating in the microprocessor 415 can then analyze these signals, decoding any received Manchester encoded data signals on the modulator signal interface line 427. In this manner, the status of any conditions related to these signals can be updated continuously.

The RSSI signal interface line 426 passes RSSI signals to an input of the multiplexer 418. The multiplexer 418 switches these signals to the analog to digital converter 419 which digitizes these signals and communicates their digital representations to the microprocessor 415 via the control and data bus 417. In this manner, the microprocessor 415 can continually read these signals into memory. The control program 414 operating in the microprocessor 415 can then analyze these signals on the RSSI signal interface line 426. In this manner, the status of any conditions related to these signals can be updated continuously.

The value of the monitoring of these signals by the control channel interface module 413 is that by decoding the Manchester encoded analog signals on the forward and reverse control channel paths and passing this data back to the fraud control system 121, the control channel interface module 413 provides the fraud control system 121 with the ability to keep track of original voice channel assignments and initial power output level assignments made to specific Mobil-IDs.

From the foregoing it will be appreciated that, although specific embodiments of the invention have been described herein for purposes of illustration, various modifications may be made without deviating from the spirit and scope of the invention. Accordingly, the present invention is not limited except as by the appended claims.

We claim:

1. In a wireless telephone network, a method of detecting an unauthorized access to a communication channel assigned to an authorized wireless telephone during an ongoing communication with the authorized telephone, comprising the steps of:

(a) monitoring a signal received from the communication channel during the ongoing communication;

(b) detecting in the received signal an unexpected shift from an expected predetermined value or a lack of shift to an expected predetermined value; and (c) determining that an unauthorized access to the communication channel of the authorized telephone by an unauthorized wireless telephone has occurred based on the unexpected shift from the expected predetermined value or the lack of shift to the expected predetermined value is detected.

2. The method according to claim 1, before step (c), further comprising the step of detecting in the received signal a message indicative of a request for a new telephone connection and wherein step (c) comprises the step of determining that the unauthorized access to the communication channel has occurred by the unauthorized wireless telephone when both the unexpected shift or lack of shift in the received signal and the message indicative of the request for the new telephone connection are detected.

3. The method according to claim 2 wherein the step of detecting in the received signal a message indicative of a request for a new telephone connection comprises the step of detecting a hook-flash message requesting a call conference.

4. The method according to claim 2 wherein the step of detecting in the received signal a message indicative of a request for a new telephone connection comprises the step of detecting a hook-flash message responsive to a call waiting signal transmitted from the wireless telephone network.

5. The method according to claim 2 wherein the step of detecting in the received signal a message indicative of a request for a new telephone connection comprises the step of detecting a message requesting a new telephone call without the need to dial an authorization number.

6. The method according to claim 5 wherein the message requesting the new telephone call without the need to dial the authorization number is a message representing the pound (#) key of a telephone.

7. The method according to claim 1 wherein step (b) comprises:

detecting an upward shift in the signal strength of the received signal beyond an expected predetermined signal strength value.

8. The method according to claim 1 wherein step (b) comprises:
   detecting a power down message transmitted from the wireless telephone network; and
   detecting a lack of downward shift in the signal strength of the received signal to an expected predetermined signal strength value indicative of a failure of the authorized wireless telephone to respond to the power down message.

9. The method according to claim 1 wherein step (b) comprises:
   detecting a phase shift in the received signal beyond a predetermined range of phase shift values, the phase shift being indicative of transmission of a signal on the communication channel by the unauthorized wireless telephone.

10. The method according to claim 9 wherein the step of detecting the phase shift in the received signal comprises:
    detecting a phase shift of a signaling audio tone (SAT) contained in the received signal.

11. The method according to claim 1, further comprising:
    preventing the unauthorized wireless telephone from establishing a telephone connection through the wireless telephone network when the unauthorized access to the communication channel by the unauthorized wireless telephone is determined.

12. The method according to claim 11 wherein the step of preventing the unauthorized wireless telephone from establishing the telephone connection through the wireless telephone network comprises:
    preventing the wireless telephone network from receiving dialed digits from the unauthorized wireless telephone.

13. The method according to claim 11 wherein the step of preventing the unauthorized wireless telephone from establishing the telephone connection through the wireless telephone network comprises:
    disabling the output of a demodulator of a communication channel receiver during receipt of dialed digits from the unauthorized wireless telephone.

14. The method according to claim 11 wherein the step of preventing the unauthorized wireless telephone from establishing the telephone connection through the wireless telephone network comprises:
    transmitting an interfering radio frequency signal on the communication channel during receipt of dialed digits from the unauthorized wireless telephone.

15. The method according to claim 11 wherein the step of preventing the unauthorized wireless telephone from establishing the telephone connection through the wireless telephone network comprises:
    inserting an interfering signal into a demodulator of a communication channel receiver to prevent receipt of dialed digits from the unauthorized wireless telephone.

16. The method according to claim 1, further comprising:
    when the unauthorized access to the communication channel by the unauthorized wireless telephone is determined,
       storing dialed digits from the unauthorized wireless telephone for later use in a fraudulent destinations analysis; and
       preventing the unauthorized wireless telephone from establishing a telephone connection through the wireless telephone network.

17. The method according to claim 1, further comprising:
    when the unauthorized access to the communication channel by the unauthorized wireless telephone is determined,
       transmitting a call termination message to one or both of the unauthorized wireless telephone and the wireless telephone network.

18. In a wireless telephone network, a method of detecting an unauthorized access to a communication channel of a given control site in the telephone network assigned to an authorized wireless telephone, the method comprising the steps of:
    (a) receiving a signal from the communication channel of the given control site;
    (b) detecting a shift or lack of shift in the received signal indicative of transmission of a signal on the communication channel by an unauthorized wireless telephone;
    (c) detecting in the received signal a communication indicative of a request for a new telephone connection within the same control site; and
    (d) determining that an unauthorized access to the communication channel by an unauthorized wireless telephone has occurred when both the shift or lack of shift in the received signal and the communication indicative of the request for the new telephone connection within the same control site are detected.

19. The method according to claim 18 wherein step (b) comprises:
    detecting in the received signal an unexpected shift from an expected predetermined value or a lack of shift to an expected predetermined value.

20. The method according to claim 18 wherein step (b) comprises:
    detecting an upward shift in the signal strength of the received signal beyond an expected predetermined signal strength value.

21. The method according to claim 18 wherein step (b) comprises:
    detecting a power down communication transmitted from the wireless telephone network; and
    detecting a lack of downward shift in the signal strength of the received signal to an expected predetermined signal strength value indicative of a failure of the authorized wireless telephone to respond to the power down communication.

22. The method according to claim 18 wherein the received signal is a radio frequency (RF) signal and wherein step (b) comprises:
    detecting a phase shift of the RF signal beyond a predetermined range of phase shift values.

23. The method according to claim 18 wherein the received signal contains a signaling audio tone (SAT) and wherein step (b) comprises:
    detecting in the SAT a phase shift beyond a predetermined range of phase shift values.

24. The method according to claim 18 wherein step (c) comprises the step of detecting a hook-flash communication initiating a call conference.

25. The method according to claim 18 wherein step (c) comprises the step of detecting a hook-flash communication responsive to a call waiting signal transmitted from the wireless telephone network.

26. The method according to claim 18 wherein step (c) comprises the step of detecting a communication requesting a new telephone call without the need to dial an authorization number.

27. The method according to claim 26 wherein the communication requesting the new telephone call without the need to dial the authorization number is a communication representing the pound (#) key of a telephone.

28. In a wireless telephone network, a system for detecting an unauthorized access to a communication channel within a cell and assigned to an authorized wireless telephone, comprising:

a data decoder connected to the communication channel receiver and operable to extract data contained in the received signal; and a processor connected to the communication channel receiver for receiving a strength indicator signal and the data decoder for receiving the extracted data, the processor being operable to detect in the received signal a shift or lack of shift indicative of transmission of a signal on the communication channel by an unauthorized wireless telephone and to detect from the extracted data a communication indicative of a request to establish a new telephone connection within the same cell as the communication channel, the processor being operable to determine the unauthorized access to the communication channel by the unauthorized wireless telephone when both the shift or lack of shift in the received signal and the communication indicative of the request to establish the new telephone connection are detected.

29. The system according to claim 28, further comprising:

a memory connected to the processor;

a fraud detection program stored in the memory and running on the processor to detect the shift or lack of shift in the received signal, to detect from the extracted data the communication indicative of the request to establish the new telephone connection, and to determine the unauthorized access to the communication channel by the unauthorized wireless telephone.

30. The system according to claim 28 wherein the data decoder includes:

an analog to digital converter connected to the communication channel receiver to convert the received signal into a digital signal for analysis by the processor.

31. The system according to claim 30, further including a communication channel receiver generating a strength indicator signal indicative of the strength of a signal received from the communication channel and wherein the analog to digital converter converts the strength indicator signal into a digital strength indicator signal for analysis by the processor.

32. The system according to claim 28 wherein the shift or lack of shift in the received signal is an upward shift in the signal strength of the received signal beyond an expected predetermined signal strength value.

33. The system according to claim 28 wherein the shift or lack of shift in the received signal is a lack of a downward shift in the signal strength to an expected predetermined signal strength value indicative of a failure of the authorized wireless telephone to respond to a power down communication transmitted from the wireless telephone network.

34. The system according to claim 28 wherein the shift or lack of shift in the received signal is a phase shift in the received signal beyond a predetermined range of phase shift values.

35. The system according to claim 34 wherein the phase shift in the received signal is a phase shift of a signaling audio tone (SAT) contained in the received signal.

36. The system according to claim 28, further comprising:

an interface line connected to the communication channel receiver and controlled by the processor to disable a demodulator of the communication channel receiver during receipt of dialed digits from the unauthorized wireless telephone.

37. The system according to claim 28, further comprising:

a radio frequency transmitter connected to the processor and operable to transmit an interfering signal on the communication channel during receipt of dialed digits from the unauthorized wireless telephone.

38. The system according to claim 28, further comprising:

a signal generator connected to the communication channel receiver and operable to generate and insert an interfering signal into the communication channel receiver to prevent the unauthorized wireless telephone from establishing the new telephone connection through the wireless telephone network.

39. The system according to claim 28, further comprising:

a radio frequency transmitter connected to the processor and operable to transmit on the communication channel a call termination communication to the wireless telephone network when the processor determines that the unauthorized access to the communication channel by the unauthorized wireless telephone has occurred.

40. In a cellular telephone network including a voice channel receiver generating a strength indicator signal indicative of the strength of a signal received from the voice channel, a system for detecting an unauthorized access to the voice channel within a cell and assigned to an authorized cellular telephone having an established telephone connection thereon, the system comprising:

a message decoder connected to the voice channel receiver and operable to extract messages contained in the received signal;

a processor connected to the voice channel receiver for receiving the strength indicator signal and the message decoder for receiving the extracted messages;

a memory; and a process stored in the memory and running on the processor to detect in the received signal an unexpected shift or lack of an expected shift indicative of transmission of a signal on the voice channel by an unauthorized cellular telephone and to detect from the extracted messages a message indicative of a request to establish a new telephone connection within the same cell as the voice channel, the process being executable to determine the unauthorized access to the voice channel by the unauthorized cellular telephone when both the shift or lack of shift in the received signal and the message indicative of the request to establish the new telephone connection are detected.

41. The system according to claim 40 wherein the data decoder includes:

an analog to digital converter connected to the communication channel receiver to convert the received signal into a digital signal for analysis by the process.

42. The system according to claim 41 wherein the analog to digital converter converts the strength indicator signal into a digital strength indicator signal for analysis by the process.

43. In a wireless telephone network, a method of detecting an unauthorized access to a communication channel assigned to an authorized wireless telephone during an ongoing communication with the authorized telephone, comprising the steps of:

monitoring a signal received from the communication channel;

detecting at least two of the following events (i) to (iii):

(i) an upward shift in the signal strength of the received signal beyond an expected predetermined signal strength value, (ii) a lack of downward shift in the signal strength of the received signal to an expected predetermined signal strength value indicative of a failure of the authorized wireless telephone to respond to a power down message, and (iii) a phase shift in the received signal beyond a predetermined range of phase shift values; and determining that an unauthorized access to the communication channel of the authorized telephone by an unauthorized wireless telephone has occurred when at least two of the events (i) to (iii) are detected.

* * * * *